US008868946B2

(12) United States Patent  
Buhari et al.

(10) Patent No.: US 8,868,946 B2  
(45) Date of Patent: Oct. 21, 2014

(54) MAINTAINING POWER TO A POWERED DEVICE DURING A LOW POWER MODE OF THE POWERED DEVICE

(75) Inventors: Riazdeen Buhari, Irving, TX (US); Martin H. Patoka, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 845 days.

(21) Appl. No.: 12/807,550

(22) Filed: Sep. 8, 2010

(65) Prior Publication Data

US 2012/0060042 A1  Mar. 8, 2012

(51) Int. Cl.
G06F 1/26      (2006.01)
G06F 1/32      (2006.01)

(52) U.S. Cl.
CPC .................................. G06F 1/266 (2013.01)
USPC .......................................................... 713/320

(58) Field of Classification Search
USPC .......................................................... 713/300
See application file for complete search history.

(56) References Cited

U.S. PATENT DOCUMENTS

| | | | |
|---|---|---|---|
| 7,484,109 B2* | 1/2009 | Feldman et al. ............... | 713/300 |
| 7,509,114 B2 | 3/2009 | Berson et al. | |
| 7,532,017 B2 | 5/2009 | Anderson | |
| 7,827,418 B2* | 11/2010 | Herbold et al. ............... | 713/300 |
| 8,004,961 B1* | 8/2011 | Buchanan et al. ............ | 370/216 |
| 2006/0019629 A1* | 1/2006 | Berson et al. ................. | 455/402 |
| 2007/0133238 A1* | 6/2007 | Herbold ........................... | 363/63 |
| 2007/0296394 A1* | 12/2007 | Landry et al. ................. | 323/371 |
| 2008/0080105 A1* | 4/2008 | Blaha et al. ...................... | 361/38 |
| 2008/0294918 A1* | 11/2008 | Dhuyvetter et al. .......... | 713/310 |
| 2009/0088908 A1* | 4/2009 | Karam ........................... | 700/297 |
| 2009/0235093 A1* | 9/2009 | Diab et al. ..................... | 713/300 |
| 2010/0007334 A1* | 1/2010 | Apfel ......................... | 324/123 R |
| 2010/0031066 A1* | 2/2010 | Geiger et al. ................. | 713/300 |
| 2010/0049998 A1* | 2/2010 | Karam et al. ................. | 713/300 |
| 2010/0077245 A1* | 3/2010 | Landry et al. ................. | 713/340 |
| 2010/0115299 A1* | 5/2010 | Darshan ........................ | 713/300 |
| 2010/0271005 A1* | 10/2010 | Vorenkamp ............... | 324/123 R |
| 2011/0125341 A1* | 5/2011 | Heath et al. .................. | 700/295 |

OTHER PUBLICATIONS

Power Over Ethernet (PoE), Block Diagram; 2010; pp. 1-3; Texas Instruments Incorporated; http://focus.ti.com/docs/solution/folders/print/375.html.

IEEE 8O23af Power Interface Switch for Power Over Ethernet (PoE) Powered Devices; TPS2370; SLUS537C; Mar. 2004; pp. 1-13; Texas Instruments Incorporated; Dallas; Texas.

(Continued)

*Primary Examiner* — Mohammed Rehman (74) *Attorney, Agent, or Firm* — William B. Kempler; Frederick J. Telecky, Jr.

(57) ABSTRACT

A powered device receives electrical power through a data transmission cable from a power supplying device that monitors a load on the data transmission cable and turns off the power to the load if the load is outside of a range. The powered device draws a first current at least part of a time during which the powered device is in a low power mode. The powered device is operable during the low power mode to draw a second current. And the powered device increases and decreases the second current to maintain a sum of the first current and the second current, or a level of a current into the powered device, at least at a minimum level for at least a portion of a cycle time.

21 Claims, 5 Drawing Sheets

(56) References Cited

OTHER PUBLICATIONS

High Power/High Efficiency PoE Interface and DC/DC Controller, TPS23754, TPS23754-1, TPS23756; SLVS885B; May 2009; pp. 1-41; Texas Instruments Incorporated; Dallas; Texas.

High Efficiency PoE Interface and DC/DC Controller, TPS23757; SLVS948; Jul. 2009; pp. 1-37; Texas Instruments Incorporated; Dallas; Texas.

Power-over-Ethernet (PoE) Solutions for both ends of the cable!; Power Over Ethernet Solutions from Texas Instruments; 2010; pp. 1-3; Texas Instruments Incorporated; http://www.ti.com/ww/en/analog/poe/index.htm.

IEEE802.3af Power Over Ethernet: A Radical New Technology; 2003; pp. 1-10; www.PowerOverEthernet.com.

Power over Ethernet; Wikipedia, the free encyclopedia; Feb. 28, 2010; pp. 1-6; Wikimedia Foundation, Inc.; http://en.wikipedia.org/wiki/Power_over_Ethernet.

\* cited by examiner

MAINTAINING POWER TO A POWERED DEVICE DURING A LOW POWER MODE OF THE POWERED DEVICE

BACKGROUND OF THE INVENTION

Many electronic devices send and receive streams of data through data transmission cables according to a wide variety of communication standards. Like all electronic devices, such devices require electrical power in order to operate. In some situations, however, it may be desirable to place such a device, and extend a data transmission cable to it, in a location where an electrical power source is not readily available. It is advantageous in many such cases, therefore, to use the data transmission cable to supply the electrical power to the electronic device. In this manner, it is not necessary to install a separate power outlet near the electronic device, and greater flexibility is achieved in the selection of locations for such devices, such as internet phones, cameras and wireless access points.

Some example systems for transmitting both data and power over conventional data transmission cables include devices defined by the "Power over Ethernet" (PoE) standards. In general, the PoE standards define power sourcing equipment (PSEs) and powered devices (PDs), such that a PSE supplies electrical power and data through Ethernet cables to one or more PDs. The PSE is typically part of a switch, router, hub or other appropriate network communication device. The PD is typically part of an internet phone, a networked camera, a wireless access point or other appropriate type of networked device that communicates through the network communication device to other networked devices. The PoE standards are defined by the IEEE 802.3af PoE standard (ratified June, 2003) and the IEEE 802.3at PoE standard, sometimes called "POE+", (ratified September, 2009). The TPS23754, TPS23754-1 and TPS23756 High Power/High Efficiency PoE Interface and DC/DC Controllers available from Texas Instruments Incorporated are examples of PoE PD interfaces and power controllers that may be incorporated into Ethernet-based devices to enable PoE functionality therein.

PoE devices are also compatible with the Ethernet standards that do not include power delivery over the Ethernet cables. Therefore, it is possible to connect a non-PoE Ethernet device (not shown) to a PSE via an Ethernet cable and transmit only data across the cable. In this case, it is undesirable to supply power through the cable to the non-PoE device, because the electrical power could damage the non-PoE device.

As a safeguard against damaging non-PoE Ethernet devices upon connecting them to a port of the PSE, the default mode for the PSE when no device is connected to an individual port thereof is to maintain the power turned off to that port, i.e. in an idle state. During this time, though, the PSE probes each of its idle ports every one to two seconds to determine whether a device has been connected to it. Thus, upon connecting an Ethernet device to one of the ports, the PSE detects the presence of the device through a handshaking procedure. The handshaking procedure enables the PSE to identify the Ethernet device as PoE-compliant before turning on power to the device and to maintain the power turned off when the Ethernet device is identified as not PoE-compliant. The PSE typically identifies a newly connected PoE PD within about one to two seconds of plugging the PD into an idle port.

While the PoE PD is connected to the port of the PSE and is generally operating normally, the fact that the PD draws current through the port enables the PSE to make an ongoing determination that power is to be maintained to the port. Therefore, when the PD is disconnected from the port of the PSE, the PSE detects the lack of current flow and, in response, turns off the power to that port. In this manner, the PSE is ready for another device to be connected, regardless of whether the new device is PoE-compliant or non-PoE-compliant.

In order to minimize power consumption and cost, it is desirable for the PoE PD to be able to enter a low power (e.g. sleep, hibernation or "green") mode at various times. However, in order to make sure that the PSE does not turn off the power to the PD when the current drawn by the PD falls so low that the PSE might determine that the PD has been disconnected, the PoE standards call for the PD to comply with a Maintain Power Signature (MPS) requirement. The MPS is a minimal electrical signature (e.g. a minimum current drawn with a maximum impedance/resistance) continuously or periodically presented by the PD to the PSE after the PSE turns on the power for the PD to assure the PSE that the PD is still present. Thus, the MPS prevents the PSE from incorrectly determining that the PD has been disconnected and inadvertently turning off the power to the PD.

Figure 1:
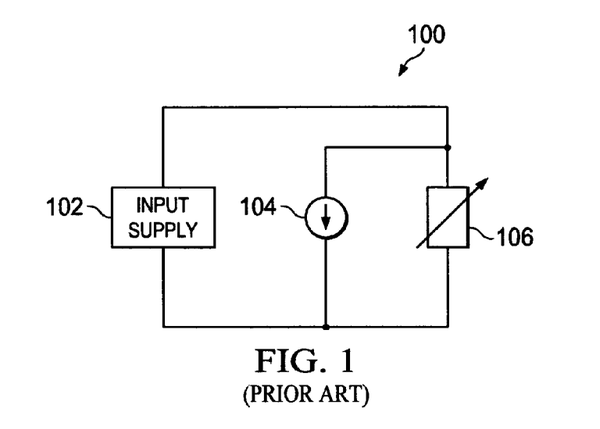
FIG. 1 is a simplified schematic diagram of a prior art circuitry for maintaining an MPS by a PD in a PoE system.

To maintain the minimum current requirement of the MPS, the PD generally has an MPS circuitry 100, as shown in an example in FIG. 1. The MPS circuitry 100 is often part of a larger component, such as a DC/DC converter, within the overall networked device. The MPS circuitry 100 generally includes an input supply voltage 102 (derived from the PSE voltage), fixed loads 104 and variable loads 106.

Powered by the input supply voltage 102 the fixed load 104 draws a steady current either all the time or only while the networked device is in its low power mode. The steady current draw of the fixed load 104 is sufficient to satisfy the MPS requirement, so the PSE does not incorrectly determine that the PD has been disconnected.

The variable load 106 represents other components that draw current in the PD, besides the fixed load 104, when the networked device is in its low power mode. For example, the variable load 106 may include an LED that is powered in order to provide a visual indication that the networked device is in the low power mode. Additionally, other circuitry may remain active, so a user or a separate electronic device (not shown) can cause the networked device to come out of the low power mode when needed.

The variable load 106 does not typically maintain a constant current draw. In fact, the current drawn by the components of the variable load 106 may vary widely and unpredictably, due to a variety of causes. Thus, it is not possible to design the fixed load 104 simply to make up whatever difference (between the PoE MPS requirements and the current drawn by the variable load 106) is needed to satisfy the PoE MPS requirements. Instead, the fixed load 104 must be able to account for the entire MPS, since the variable load 106 is insufficiently reliable or predictable to maintain a proper MPS. By designing the fixed load 104 to account for the entire MPS, however, the power usage by both the variable load 106 and the fixed load 104 will often put the PD well over the MPS minimum. As a result, there may be significant unnecessary waste of power by the combined operation of the variable load 106 and the fixed load 104. This waste of power renders the green or low power mode highly inefficient.

DETAILED DESCRIPTION OF THE INVENTION

Figure 2:
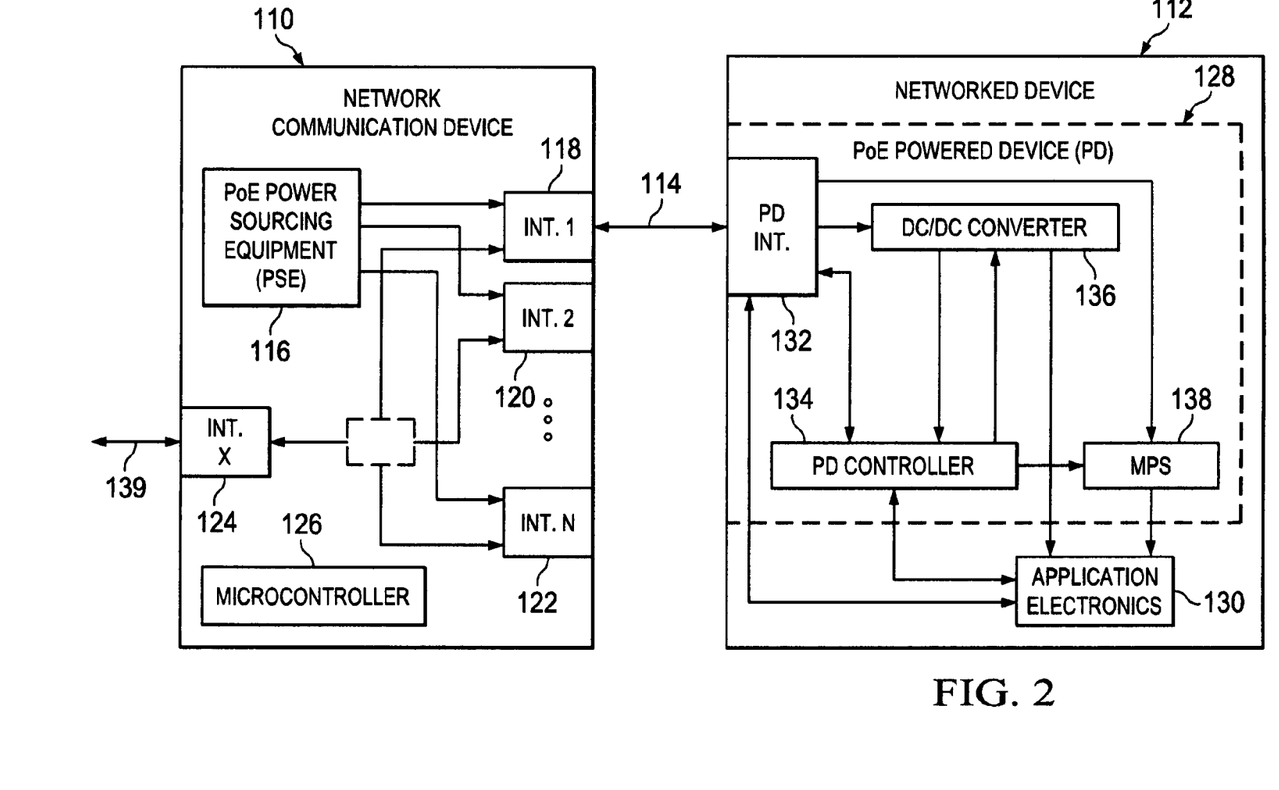
FIG. 2 is a simplified schematic diagram of an Ethernet system incorporating an embodiment of the present invention.

FIG. 2 shows a simplified example of an Ethernet system 108 with Power over Ethernet (PoE) that generally includes a Network Communication Device 110 (e.g. a switch, router, hub, etc.), and one or more Networked Devices 112 (e.g. an internet phone, a networked camera, a wireless access point, etc.) connected by one or more Ethernet cables 114. The Network Communication Device 110 generally includes a PSE 116, several ports or interfaces (Int. 1, Int. 2 . . . Int. N and Int. X) 118, 120, 122 and 124 and a microcontroller 126, among other possible components that depend on the type of Ethernet device the Network Communication Device 110 is. The Networked Device 112 generally includes a PD 128 and Application Electronics 130. The PD 128 generally includes a port or interface (PD Int.) 132, a PD controller 134, a DC/DC converter (or other appropriate type of power converter) 136 and an MPS circuitry 138.

The Networked Device 112 can enter a low power mode (e.g. a sleep, hibernation or "green" mode) during which the MPS circuitry 138 ensures that the Maintain Power Signature (MPS) requirements are properly met, so the PSE 116 does not inadvertently turn off power to the PD 128. Therefore, the MPS circuitry 138 contributes to the overall current draw of the PD 128. However, unlike the prior art MPS circuitry 100 above, the MPS circuitry 138 includes adaptive mechanisms (described below) to handle variations in the current drawn by other components during the low power mode to prevent the overall current draw of the PD 128 from increasing above the MPS required minimum when not necessary. In this manner, the PoE MPS requirements are met, while minimizing/optimizing overall power usage of the Networked Device 112 during the low power mode.

Although the present invention is described with respect to its use in a PD of a PoE system, it is understood that the present invention is not necessarily so limited, except where specifically called for in the claims. Other systems in which power is supplied through data transmission lines may also incorporate the present invention where appropriate to ensure that the power supply is maintained while making optimum use of the power during a low power situation. Furthermore, whether in a PoE system or other type of system, the components that inject power onto the data transmission line (e.g. the Ethernet cable 114) or extract power from the data transmission line may be either embedded circuitry within the connected communication devices (e.g. the Network Communication Device 110 and the Networked Device 112), as shown in the PoE example of FIG. 2, or external adaptors connected to the data transmission line or the communication devices. (A device containing the PSE 116, the interfaces 118-122, and matching data-only interfaces is referred to as a "midspan PSE," which passively combines Ethernet data with the power.) It is understood, therefore, that the depiction of the power supplying and receiving components in FIG. 2 as being embedded in the Network Communication Device 110 and the Networked Device 112, respectively, is for illustrative purposes only and not intended to limit the scope of the present invention.

Additionally, it is understood that the Network Communication Device 110 is shown for illustrative purposes only. Thus, other configurations for the Network Communication Device 110 for a variety of types of data communication situations may be used.

The PSE 116, as illustrated, generally communicates the PoE protocol and electrical power through the interfaces 118-122 and Ethernet cables (e.g. 114) with the PDs (e.g. 128) that are "downstream" in an overall Ethernet network of which the Ethernet system 108 may be a part. Through the interface 124 (and a transmission line 139), on the other hand, the Network Communication Device 110 generally communicates "upstream" with other Ethernet devices or devices in other networks (e.g. the Internet, WANs, LANs, SANs, etc.). Thus, the Network Communication Device 110, under control of the microcontroller 126, generally handles data transmission among the downstream Ethernet devices and between any of the downstream Ethernet devices and any upstream device.

Furthermore, the PSE function may be combined in a single piece of equipment with Ethernet data communications processing and transmission circuits (commonly referred to as an "endspan PSE") wherein the data and power are both applied to the data transmission line 114 through the interfaces 118-122. Alternatively, the PSE functionality may be located in a separate piece of equipment (i.e. a "midspan PSE") that is connected to the transmission line between the upstream data source and the Networked Device 112 containing the PD 128. The midspan PSE combines data from the "upstream" data source with power delivered through the interfaces 118-122.

For any downstream Ethernet devices (not shown) that are not PoE-compliant, the PSE 116 does not apply power to the Ethernet cable 114, but permits data transmission through the interfaces 118-122. On the other hand, in addition to passing data communications for any of the downstream Ethernet devices that the PSE 116 has determined are PoE-compliant, such as the PD 128, the PSE 116 injects a voltage through selected ones of the interfaces 118-122 and the Ethernet cables 114 to supply electrical power to these devices in accordance with the PoE standards. The PSE 116, therefore, under control of the microcontroller 126 or other appropriate circuitry, selectively supplies a voltage only to those interfaces (e.g. 118) to which the PSE 116 has determined that a PoE enabled networked device (e.g. the Networked Device 112) is connected.

The Networked Device 112 may be any appropriate networked Ethernet device. For example, potential applications of PoE include cameras, IP (Internet Protocol) phones and wireless network (e.g. WIFI) routers, among other types of networked devices.

The PD controller 134, a control circuitry portion within the DC/DC converter 136 and the MPS circuitry 138, although they are shown as separate elements in the schematic diagram, may be combined within a single integrated circuit (IC). Additionally, the schematic block for the MPS circuitry 138 represents components that may optionally be incorporated into the PD controller 134, or the DC/DC converter 136. Therefore, the exact schematic blocks and interconnections shown in FIG. 2 are for illustrative purposes only and not intended to limit the scope of the present invention. In some alternative embodiments, for example, the MPS circuitry 138 is generally placed between the DC/DC converter 136 and either the interface 132 or the PD controller 134.

The Application electronics 130 represents a variety of different possible types of circuitry that generally manage the primary functions of the Networked Device 112, e.g. IP telephony, wireless routing, etc. The PD controller 134 handles the power protocols through the interface 132, while the Application electronics 130 handles the data transmission functions. The DC/DC converter 136, under control of the PD controller 134 and embedded DC/DC control, extracts the electrical power from the interface 132 and supplies the power to the other components (e.g. the Application electronics 130) of the Networked Device 112.

When the Networked Device 112 is fully operational, it may consume a substantial portion of the power that is available from the PSE 116. However, the Networked Device 112 also preferably has the capability to enter a low power (e.g. sleep, hibernation, "green", etc.) mode. The low power mode generally permits power savings (e.g. at night or according to some other criteria) by turning off most of the active load circuits (e.g. all or part of the Application electronics 130) while maintaining enough functionality (e.g. within the PD controller 134 or the Application electronics 130) for the Networked Device 112 to respond to a local power-up request (e.g. by a user-activated button or switch). The low power mode may be triggered automatically within the Networked Device 112 (e.g. by the PD controller 134 or the Application electronics 130), by a user-activated switch on the Networked Device 112 and/or by a signal from the PSE 116.

During the low power mode, the MPS circuitry 138 ensures that the PD 128 produces the MPS, according to the PoE standards, so the PSE 116 does not erroneously determine that the PD 128 (i.e. the Networked Device 112) has been disconnected and inadvertently turn off the power to the PD 128. According to the PoE standards, the MPS requirement is generally satisfied if the PD 128 draws a specified current (minimum 10 milliamps for a minimum duration of 75 milliseconds followed by a maximum optional dropout time of 250 milliseconds), or maintains a specified impedance (maximum resistive component of about 26.25 KOhms and minimum capacitive component of 0.050 microfarads). Taking into consideration tolerances, the PSE 116 should thus detect a 5-10 milliamp current draw at the port to which the Networked Device 112 is attached within 60 milliseconds. The PSE 116 generally determines that the Networked Device 112 has been disconnected if the current draw of the PD 128 is absent for about 300-400 milliseconds.

According to some embodiments, in order to satisfy the PoE MPS requirements, the minimum current drawn by the PD 128 is preferably set at about 10-11 milliamps, an acceptable duration for drawing the minimum current is about 75-84 milliseconds and the optional dropout time is less than about 250 milliseconds. Alternatively, a total period for one cycle may be about 300 milliseconds. In another alternative, the MPS current requirement is generated at about 3 Hz with a duty cycle of about 28 to 28.5%. Other alternatives that comply with the PoE MPS requirements or other possible standard or proprietary designs may also be within the scope of the present invention.

According to some embodiments, the MPS circuitry 138 (FIG. 3) generally includes an input supply voltage 140 (derived from the PSE 116 output received through the Interface 132), a controllable current source or load 142, a variable or programmable current source or load 144, a current sense or monitor circuitry 146 and an error amplifier 148. The input supply voltage 140 preferably represents voltage regulation components (optionally part of the DC/DC converter 136 or the PD Controller 134) that generate a sufficient voltage for the low power mode from the voltage received through the interface 132. The input supply voltage 140 is thus preferably regulated to an appropriate level and its current may be pulsed in accordance with the period and duty cycle selected to satisfy the MPS requirement.

Figure 3:
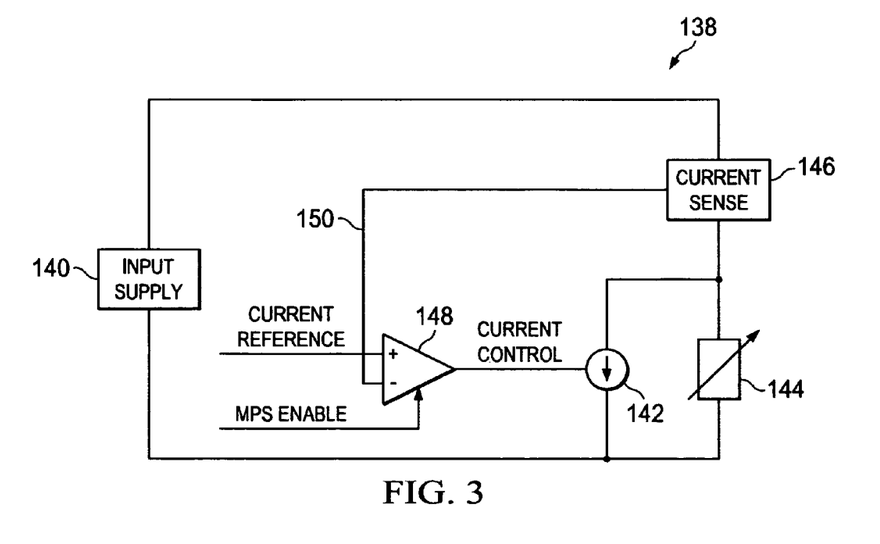
FIG. 3 is a simplified schematic diagram of a circuitry for maintaining an MPS by a PD in the Ethernet system shown in FIG. 2 according to an embodiment of the present invention.

The variable or programmable current source or load 144 preferably represents components (e.g. within the PD controller 134 and/or the Application electronics 130) that are turned on, or that remain on, during the low power mode. Such components may include, but are not limited to, an LED (or other indicator that the Networked Device 112 is in the low power mode) and/or other circuitry that may remain active in order to enable a user or a separate electronic device (not shown) to cause the Networked Device 112 to exit the low power mode when needed. The current drawn by the variable or programmable current source or load 144 may change as some of these components are turned on or off (depending on functions that remain active during the low power mode) and/or as the temperature of the components varies.

According to some alternative embodiments, the variable or programmable current source or load 144 may also be used for other purposes when the Networked Device 112 is in an operational power mode, instead of the low power mode. For instance, in an example in which the Networked Device 112 is an IP phone and the variable or programmable current source or load 144 is an LED used to indicate when the Networked Device 112 is in the low power mode, the LED may also be used during the operational power mode to indicate that an IP phone conference is currently active. Other optional uses during the operational power mode for the variable or programmable current source or load 144 (whether an LED or other component) within the Networked Device 112 (whether an IP phone or other appropriate type of device that receives power over a data transmission line) are within the scope of the present invention.

The current sense circuitry 146 generally represents any appropriate components that can generate a voltage or signal (on a line 150) based on the level of the current from the input supply voltage 140. And since all, or almost all, other active load circuits of the Networked Device 112 are turned off during the low power mode, the current from the input supply voltage 140 is the same as, or very close to, the current received by the Networked Device 112 at the interface 132. Therefore, the voltage generated by the current sense circuitry 146 on the line 150 is generally representative of the level of the total current into the Networked Device 112 during the low power mode. (In an embodiment in which the PD controller 134, the control circuitry within the DC/DC converter 136 and the MPS circuitry 138 are combined within a single IC, for example, the total current into the Networked Device 112 during the low power mode may generally include the bias currents of the IC and any current needed for components (e.g. the LED) of the variable or programmable current source or load 144 that are external to the IC.)

The error amplifier 148, or other appropriate circuit component(s) (e.g. a comparator, etc.), generally receives the voltage generated by the current sense circuitry 146 on the line 150, a "current reference" voltage and an "MPS enable" signal. Based on these inputs, the error amplifier 148 generally produces a "current control" signal. The current reference voltage generally represents the desired minimum level (the MPS requirement) for the total current into the Networked Device 112 during the low power mode and is received by the error amplifier 148 at a positive input. The voltage generated by the current sense circuitry 146 on the line 150 is received by the error amplifier 148 at a negative input. The MPS enable signal activates the error amplifier 148 (and generally indicates that the Networked Device 112 is in the low power mode and the MPS circuitry 138 is active). When the MPS enable signal is on, the error amplifier 148 produces the current control signal depending on whether the current reference voltage is greater than the voltage generated by the current sense circuitry 146 on the line 150. Additionally, the MPS enable signal may be pulsed in accordance with the period and duty cycle selected to satisfy the MPS requirement, so the output current control signal may also be pulsed.

The controllable current source or load 142 represents one or more electronic components that can be controlled by error amplifier 148 to adjust the current drawn as needed. The need for the current drawn by the controllable current source or load 142 may vary depending on the current drawn by the variable or programmable current source or load 144, since the sum of these two currents is the same (or almost the same) as the total current drawn by the Networked Device 112 during the low power mode. Therefore, the action of the controllable current source or load 142, under control of the error amplifier 148 in response to the voltage generated by the current sense circuitry 146 on the line 150 relative to the current reference voltage, serves to regulate the total current drawn by the Networked Device 112 to the desired MPS minimum level.

In other words, when the current drawn by the variable or programmable current source or load 144 is below the desired minimum level for the total current drawn by the Networked Device 112, the current sense circuitry 146 and the error amplifier 148 will cause the controllable current source or load 142 to draw enough current to maintain the total current drawn by the Networked Device 112 at the desired minimum level. On the other hand, when the current drawn by the variable or programmable current source or load 144 is at or above the desired minimum level, the voltage generated by the current sense circuitry 146 on the line 150 will equal to or greater than the current reference voltage, so the error amplifier 148 will not output the current control signal, thereby turning off the controllable current source or load 142. In this case, the controllable current source or load 142 will not draw any current, so the total current drawn by the Networked Device 112 will not be raised unnecessarily. In this manner, the MPS circuitry 138 ensures that the MPS minimum current requirements are met without wasting electrical power.

Figure 4:
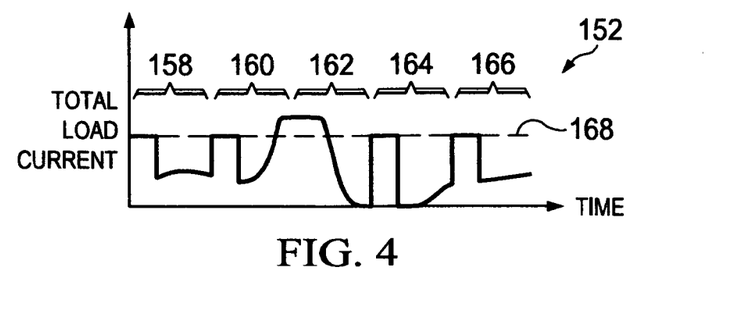
FIG. 4 is a simplified graph of an example total load vs. time for a PD in the Ethernet system shown in FIG. 2 during a low power mode according to an embodiment of the present invention.
Figure 5:
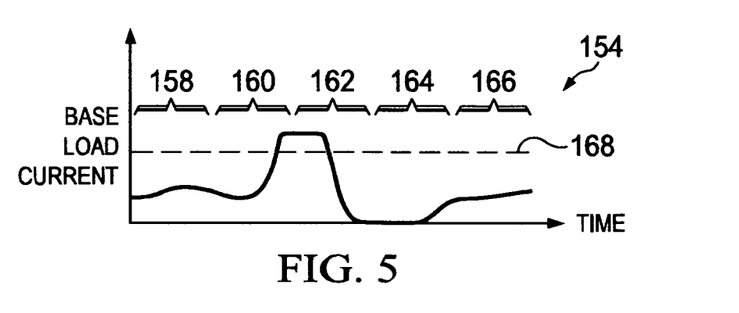
FIG. 5 is a simplified graph of an example base load vs. time for a PD in the Ethernet system shown in FIG. 2 during a low power mode according to an embodiment of the present invention.
Figure 6:
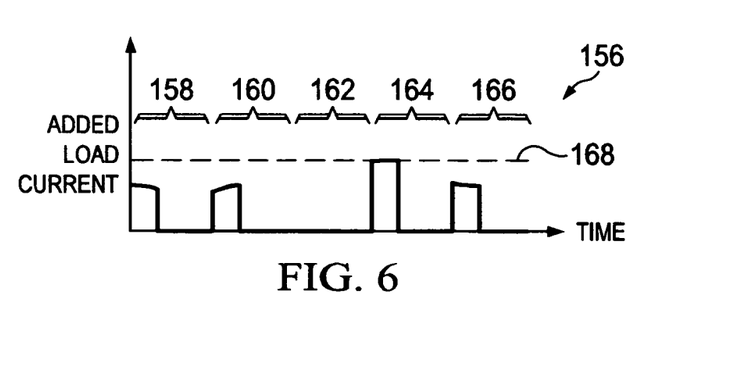
FIG. 6 is a simplified graph of an example added load vs. time for a PD in the Ethernet system shown in FIG. 2 during a low power mode according to an embodiment of the present invention.

Load current vs. time graphs 152, 154 and 156 in FIGS. 4, 5 and 6, respectively, illustrate the results of the function of the MPS circuitry 138 in some example situations with five hypothetical pulse cycles (158-166) in an embodiment using a pulsed MPS. Graph 152 generally shows the variation of the total load current drawn by the Networked Device 112 over the five cycles (158-166). Graph 154 generally shows the variation of only a "base" load current, which is the current drawn by the variable or programmable current source or load 144 (and other active circuit components, if any, of the Networked Device 112). Graph 156, on the other hand, generally shows the variation of only the added load current drawn by the controllable current source or load 142. The total load current graph 152 is generally the sum of the added load current graph 156 and the base load current graph 154. Thus, the total load current graph 152 generally represents an example for the monitored current through the current sense circuitry 146. Additionally, the required MPS minimum level for the total current drawn by the Networked Device 112 is shown by a dashed line 168 in each of the graphs 152, 154 and 156.

During the dropout times between MPS pulses, the current drawn by the controllable current source or load 142 preferably falls to zero (or near zero), as shown by the added load current graph 156 in FIG. 6. Therefore, in FIG. 4, the total load current graph 152 during the dropout times is the same (or approximately the same) as the base load current graph 154 in FIG. 5.

The base load current (graph 154) is shown as varying throughout the five hypothetical pulse cycles (158-166). From the start of the first cycle 158 until a point shortly before the end of the second cycle 160, the base load current (graph 154) generally fluctuates, but stays below the required MPS minimum level for the total current drawn by the Networked Device 112 (dashed line 168). At the point shortly before the end of the second cycle 160, the base load current (graph 154) rises above the required MPS minimum level 168 and falls back below the required MPS minimum level 168 at a point shortly before the middle of the third cycle 162. From that point, the base load current (graph 154) goes to zero before the end of the third cycle 162. The base load current (graph 154) begins to increase again shortly after the middle of the fourth cycle 162, but stays below the required MPS minimum level 168 to the end of the fifth cycle 166.

Due to the variations in the base load current (graph 154), the MPS circuitry 138 has to add the pulses to the total current drawn by the Networked Device 112 to satisfy the MPS requirements during only the first, second, fourth and fifth cycles 158, 160, 164 and 166, as shown by the added load current graph 156. The level of the added load current (graph 156) during these pulses is generally the difference between the required MPS minimum level 168 and the level of the base load current (graph 154). And since the base load current (graph 154) is shown to vary even during the MPS pulse times of the first, second and fifth cycles 158, 160 and 166, the added load current (graph 156) varies correspondingly in the opposite direction. During the MPS pulse time in the fourth cycle 164, however, the base load current (graph 154) is about at a constant zero, so the added load current (graph 156) is held relatively constant at no higher than the required MPS minimum level 168.

During the MPS pulse time in the third cycle 162, on the other hand, the base load current (graph 154) is above the required MPS minimum level 168. Therefore, the MPS circuitry 138 has to add nothing to the total current drawn by the Networked Device 112 to satisfy the MPS requirements during the third cycle 162, so the added load current (graph 156) remains zero at this time.

In an alternative embodiment, a less efficient mode is also possible in this configuration in which the MPS current draw by the MPS circuitry 138 is maintained continuously at the required MPS minimum level for the total current drawn by the Networked Device 112 (dashed line 168). This mode of operation, although not optimal, may be required to satisfy a PSE 116 that does not correctly implement the required timing parameters.

Figure 7:
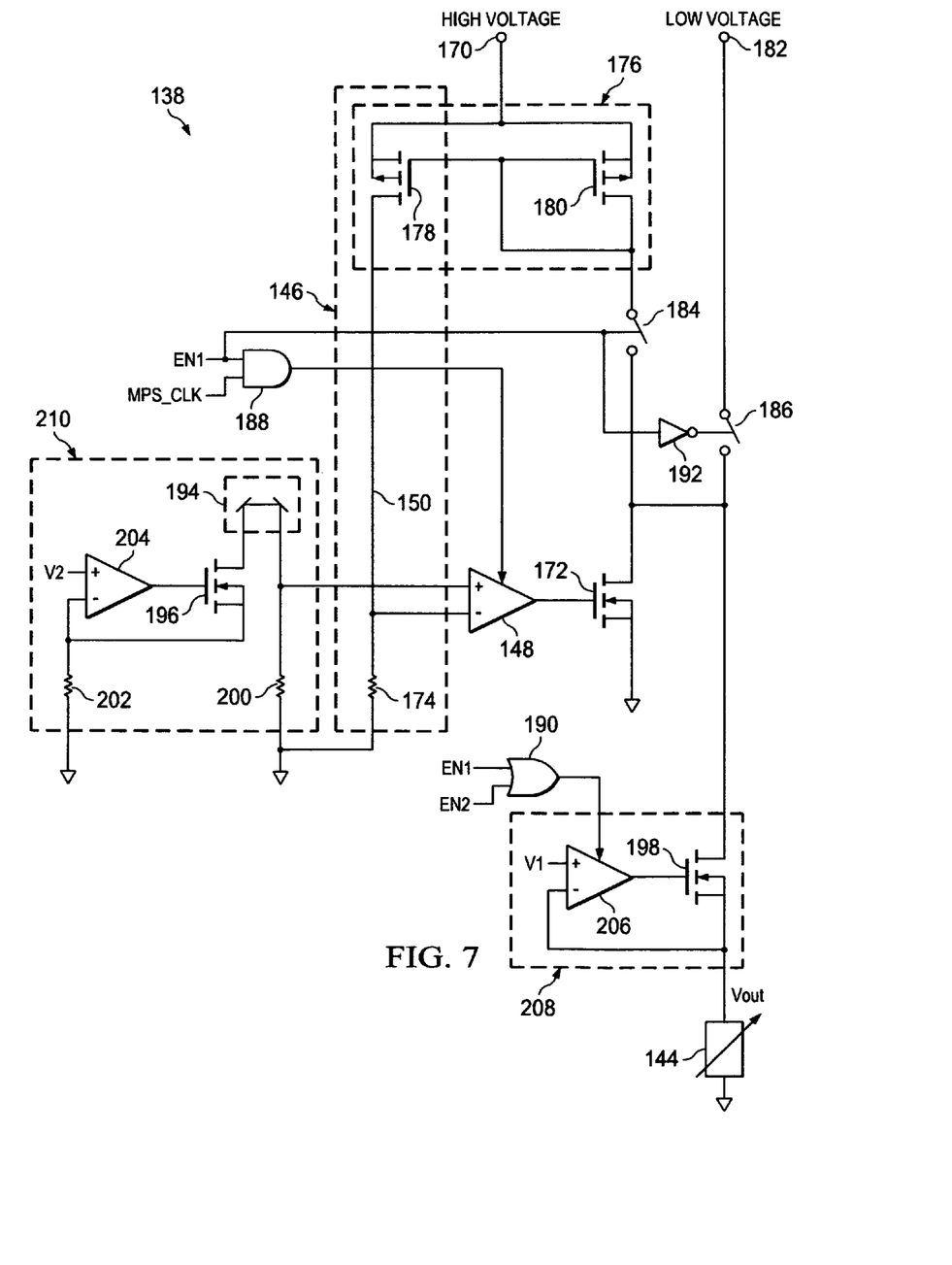
FIG. 7 is a more detailed, but still simplified, schematic diagram of the circuitry for maintaining an MPS shown in FIG. 3 according to an embodiment of the present invention.

FIG. 7 provides a more detailed description of an example embodiment for the MPS circuitry 138 shown in FIG. 3. The variable or programmable current source or load 144 and the error amplifier 148 are generally shown as before. Additionally, the line 150 in FIG. 3 has a general equivalent as indicated in FIG. 7. In this example embodiment, however, the input supply voltage 140 is generally a high-voltage input 170, which is preferably derived through the interface 132 and may be pulsed in accordance with the period and duty cycle selected to satisfy the MPS requirement. The controllable current source or load 142 is generally a MOSFET 172. And the current sense or monitor circuitry 146 is generally a resistor 174 and a current mirror 176 (MOSFET transistors 178 and 180).

The MPS circuitry 138 in FIG. 7 also generally includes an optional low-voltage input 182, switches 184 and 186, an AND gate 188, an OR gate 190, an inverter 192, a second current mirror 194, additional MOSFET transistors 196 and 198, resistors 200 and 202 and additional error amplifiers 204 and 206. The low-voltage input 182 is generally an alternative supply voltage for powering the variable or programmable current source or load 144 when the Networked Device 112 is not in the low power mode, according to some embodiments of the present invention. Additional inputs into the MPS circuitry 138 generally include enable signals (EN1 and EN2), an MPS pulse clock signal (MPS_CLK) and reference voltages (V1 and V2). The output of the MPS circuitry 138 to the variable or programmable current source or load 144 is generally at a node Vout.

An alternative embodiment, however, may use only a single voltage input (e.g. the high-voltage input 170). In this case, the low-voltage input 182, the second switch 186 (or possibly both switches 184 and 186), the inverter 192, the second enable signal EN2 and the OR gate 190 are preferably not included.

In the illustrated embodiment, the high-voltage input 170 is generally connected to the variable or programmable current source or load 144 at Vout through the MOSFET transistor 180, the switch 184 and the MOSFET transistor 198. The low-voltage input 182, on the other hand, passes through the other switch 186 to the MOSFET transistor 198 and then to the variable or programmable current source or load 144 at Vout. The first switch 184 is operated by the enable signal EN 1, and the second switch 186 is operated by the inverted enable signal EN1, i.e. after EN1 passes through the inverter 192. In this manner, either the high-voltage input 170 or the low-voltage input 182 is used to power the variable or programmable current source or load 144 at Vout.

The MOSFET transistor 198 and the error amplifier 206 form a voltage regulator 208 to regulate the output voltage at Vout. The voltage regulator 208 generates the output voltage at Vout using either the high-voltage input 170 or the low-voltage input 182, depending on the state of the enable signal EN1. The output voltage at Vout is supplied as feedback (through a voltage divider, if needed) to the negative input of the error amplifier 206. And the reference voltage V1 is supplied to the positive input of the error amplifier 206. (The reference voltage V1 may be, for example, a band-gap voltage or internal reference voltage of an IC in which the MPS circuitry 138 is included or other voltage that is preferably relatively constant over an expected temperature range.) In this manner, the output voltage at Vout is regulated to a desired level, as is appropriate for the variable or programmable current source or load 144, from either the high-voltage input 170 or the low-voltage input 182.

The enable signal EN1 generally indicates whether the Networked Device 112 is in the low power mode or the operational power mode. In the operational power mode, for instance, the enable signal EN1 is not asserted, so the MPS function of the MPS circuitry 138 is disabled and the DC/DC converter 132 (FIG. 2) is fully enabled. In the low power mode, on the other hand, the enable signal EN1 is asserted, so the MPS function of the MPS circuitry 138 is enabled and most (if not all) of the DC/DC converter 132 is disabled. Since the DC/DC converter 132 is generally disabled in the low power mode, options for the source for the high-voltage input 170 are likely to be relatively restricted. Whereas, in the operational power mode, a variety of different sources for the low-voltage input 182 may be available in the DC/DC converter 132, depending on the design thereof. As a result, a more efficient or better optimized (e.g. with respect to power conservation, performance, etc.) source for powering the variable or programmable current source or load 144 may be more readily available in the operational power mode than is available in the low power mode. The presence of two voltage inputs (the high-voltage input 170 and the low-voltage input 182) in the illustrated embodiment, therefore, enables usage of the most appropriate available voltage source in both the operational power mode and the low power mode.

Both of the enable signals EN1 and EN2 are applied as inputs to the OR gate 190. The output of the OR gate 190 is supplied to the error amplifier 206 to turn on the output voltage regulator 208 when asserted, thereby generating the regulated output voltage at Vout for the variable or programmable current source or load 144 (e.g. turning on an LED indicator, enabling a wake-up circuitry, etc.). In other words, the voltage at Vout is generated, or turned on, when either enable signal EN1 or EN2 is asserted.

Since assertion of the enable signal EN1 generally puts the Networked Device 112 in the low power mode, and since the variable or programmable current source or load 144 (e.g. as an LED) is used in some embodiments to indicate that the Networked Device 112 is in the low power mode, it is preferable in the illustrated embodiment to use the enable signal EN1 to both connect the high-voltage input 170 to the voltage regulator 208 and to turn on the voltage regulator 208. In this manner, only one enable signal (EN1) is needed to cause the MPS circuitry 138 to generate the output voltage at Vout during the low power mode, since this embodiment assumes that the variable or programmable current source or load 144 is activated throughout the entire low power mode. On the other hand, since it is preferable to use a different voltage source (i.e. the low-voltage input 182) during the operational power mode, and since the variable or programmable current source or load 144 (e.g. as an LED) is preferably activated only occasionally when the Networked Device 112 is in the operational power mode, it is preferable in the illustrated embodiment to use one enable signal (inverted EN1) to connect the low-voltage input 182 to the voltage regulator 208 and a second enable signal (EN2) to turn on the voltage regulator 208. In this manner, the low-voltage input 182 is immediately connected to the voltage regulator 208 upon entering the operational power mode, but the output voltage at Vout is generated by the voltage regulator 208 only when needed during this mode.

The current mirror 176 ensures that the current through the MOSFET transistor 180 is directly proportional (e.g. multiplied by a factor of N) to the current through the other MOSFET transistor 178. And the sum of these two currents is the current into the MPS circuitry 138, which is generally the total current (or almost the total current) into the PD 128 (and, thus, also into the overall Networked Device 112) during the low power mode, since all (or almost all) other circuits of the Networked Device 112 are turned off during this mode. In other words, the current through the other MOSFET transistor 178 is directly proportional to the total current (or almost the total current) into the PD 128 (and the Networked Device 112) during the low power mode. Additionally, the current through the other MOSFET transistor 178 is supplied through line 150 and through the resistor 174 to ground, so the voltage on line 150 is directly proportional to, i.e. representative of, the total current (or almost the total current) into the PD 128 (and the Networked Device 112) during the low power mode. The voltage on line 150 is supplied to the negative input of the error amplifier 148. In this manner, the voltage generated by the current sense circuitry 146 (resistor 174 and current mirror 176, and see also FIG. 3) on the line 150 in effect enables monitoring of the value of the current into the PD 128 (and the Networked Device 112) by the error amplifier 148 relative to the current reference voltage at the positive input of the error amplifier 148.

The current reference voltage at the positive input of the error amplifier 148 is generated by a programmable reference voltage generator 210 formed by the second current mirror 194, the MOSFET transistor 196, the resistors 200 and 202 and the error amplifier 204. The current mirror 194 ensures that a current flowing to the MOSFET transistor 196 (the left output of the current mirror 194, as seen in FIG. 7) is directly proportional to a current flowing to the resistor 200 (the right output of the current mirror 194). Under control of the error amplifier 204 and the MOSFET transistor 196, the current from the left output of the current mirror 194 flows through the resistor 202 to ground. The current through the resistor 202 causes a voltage at the connection of the MOSFET transistor 196 and the resistor 202, and this voltage is fed back to the negative input of the error amplifier 204. The reference voltage V2 is supplied to a positive input of the error amplifier 204 and causes the error amplifier 204 to control the MOSFET transistor 196 in such a manner as to regulate the voltage at the conjunction of the MOSFET transistor 196, the resistor 202 and the negative input of the error amplifier 204. (The reference voltage V2 may be, for example, a band-gap voltage or internal reference voltage of an IC in which the MPS circuitry 138 is included or other voltage that is preferably relatively constant over an expected temperature range.)

The regulated voltage (of the error amplifier 204 and the MOSFET transistor 196) and the resistance of the resistor 202 determine the current through the resistor 202, which is approximately the same as the current from the left output of the current mirror 194, which is directly proportional to the current from the right output of the current mirror 194, almost all of which passes through the resistor 200 to ground, thereby generating the reference voltage supplied to the positive input of the error amplifier 148. The resistor 202, therefore, renders the reference voltage generator 210 "programmable", since a designer of the PD 128 (and the Networked Device 112, FIG. 2) can select a resistance value for the resistor 202 that will result in the generation of a desired current reference voltage to be supplied to the positive input of the error amplifier 148. In an embodiment in which the MPS circuitry 138 (e.g. optionally along with the PD controller 130 and the controller section of the DC/DC converter 132) is incorporated in an IC, the resistor 202 may be left as an external component (i.e. external to the IC), so the designer of the PD 128 (and the Networked Device 112) can select the resistance value of the resistor 202 in order to select the current reference voltage used to enable monitoring of the value of the total current into the PD 128 (and the Networked Device 112) by the error amplifier 148.

When the voltage generated by the current sense circuitry 146 on the line 150 is greater than the current reference voltage at the positive input of the error amplifier 148, the error amplifier 148 will decrease its output. On the other hand, when the voltage generated by the current sense circuitry 146 on the line 150 is less than the current reference voltage at the positive input of the error amplifier 148, the error amplifier 148 will increase its output. The output of the error amplifier 148 is the current control signal supplied to the controllable current source or load 142 (FIG. 3), which is the MOSFET 172.

When the current control signal from the error amplifier 148 decreases, the MOSFET 172 decreases the current that flows through it to ground. On the other hand, when the current control signal from the error amplifier 148 increases, the MOSFET 172 increases the current that flows through it to ground. Any current that flows through the MOSFET 172, in response to the output of the error amplifier 148, is added directly to the total current into the PD 128 (and the Networked Device 112) and is reflected in the current and, thus, the voltage on the line 150, which inversely affects the output of the error amplifier 148 and the current through the MOSFET 172.

Additionally, since the value of the resistor 202 determines the current reference voltage for the error amplifier 148, the value of the resistor 202 also affects the current through the MOSFET 172 accordingly. Therefore, the designer of the PD 128 (and the Networked Device 112) can in effect set the minimum current that the PD 128 (and the Networked Device 112) will draw during the low power mode (e.g. in order to satisfy the MPS requirements) by selecting the value of the resistor 202.

The MPS enable signal (FIG. 3), supplied to the error amplifier 148, is generally the output of the AND gate 188 (FIG. 7). The enable signal EN1 and the MPS pulse clock signal MPS_CLK are the inputs to the AND gate 188. The MPS pulse clock signal MPS_CLK is preferably pulsed in accordance with the period and duty cycle selected to satisfy the MPS requirement. Thus, when the enable signal EN1 is asserted (indicating that the Networked Device 112 is in the low power mode), the MPS enable signal is also pulsed in accordance with the period and duty cycle selected to satisfy the MPS requirement. In this manner, the error amplifier 148 is activated with the same period and duty cycle, so the MPS circuitry 138 will cause the PD 128 (and the Networked Device 112) to draw the minimum MPS current in a pulsed manner with this period and duty cycle.

In some embodiments in which the minimum MPS current is drawn continuously, the enable signal EN1 is preferably supplied directly to the error amplifier 148, so it is not necessary to include the AND gate 188 in the MPS circuitry 138. On the other hand, in some embodiments in which it is preferable to be able to choose whether the minimum MPS current is drawn continuously or pulsed, the AND gate 188 is included as shown and as described above, but the MPS pulse clock signal MPS_CLK may be either continuous or pulsed accordingly.

Figure 8:
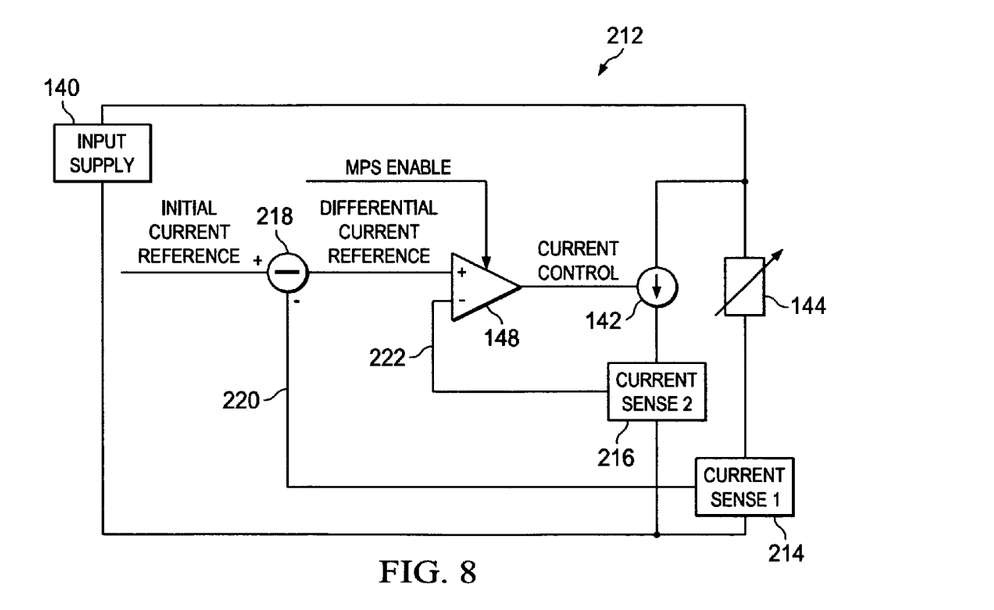
FIG. 8 is a simplified schematic diagram of an alternative circuitry for maintaining an MPS by a PD in the Ethernet system shown in FIG. 2 according to an alternative embodiment of the present invention.

An alternative embodiment for an MPS circuitry 212 that may be used in place of the MPS circuitry 138 in the PD 128 (FIG. 2) is shown in FIG. 8. The MPS circuitry 212 preferably includes the input supply voltage 140, the controllable current source or load 142, the variable or programmable current source or load 144 and the error amplifier 148, which are similar to the same-numbered components of the MPS circuitry 132, as described above. However, the MPS circuitry 212 also generally includes first and second current sense or monitor circuitries 214 and 216 and a voltage subtractor 218.

The first and second current sense or monitor circuitries 214 and 216 generally represent any appropriate components that can generate first and second current monitor voltages or signals on lines 220 and 222, respectively, based on the level of the currents through the first and second current sense or monitor circuitries 214 and 216. And since all, or almost all, other active load circuits of the Networked Device 112 are turned off during the low power mode, the currents through the first and second current sense or monitor circuitries 214 and 216 are the same as, or very close to, the current received by the PD 128 (and the Networked Device 112) at the interface 128.

Therefore, the monitoring of the currents through the first and second current sense or monitor circuitries 214 and 216 generally accounts for all (or almost all) of the total current into the PD 128 (and the Networked Device 112) during the low power mode. (Examples for the monitored currents through the first and second current sense or monitor circuitries 214 and 216 are generally represented by the base load current graph 154 of FIG. 5 and the added load current graph 156 of FIG. 6, respectively.)

The first and second current sense or monitor circuitries 214 and 216 are shown connected to the low side of the variable or programmable current source or load 144 and the controllable current source or load 142, respectively. However, either or both of the first and second current sense or monitor circuitries 214 and 216 could be connected on the high side of the variable or programmable current source or load 144 and/or the controllable current source or load 142, respectively.

The voltage subtractor 218 receives the first current monitor voltage or signal on line 220 from the first current sense or monitor circuitry 214 and an "initial current reference" voltage. The initial current reference voltage generally represents the desired minimum level (the MPS requirement) for the total current into the Networked Device 112 during the low power mode. The voltage subtractor 218, in effect, determines the difference between the initial current reference voltage and the first current monitor voltage on line 220 to produce a "differential current reference" voltage. The differential current reference voltage, therefore, generally represents the amount of current that needs to be added to the overall current into the Networked Device 112 in order to satisfy the MPS minimum requirement during the low power mode. However, if the first current monitor voltage on line 220 is greater than the initial current reference voltage, then the differential current reference voltage is preferably zero.

The differential current reference voltage is supplied to the positive input of the error amplifier 148. The second current monitor voltage or signal on line 222 from the second current sense or monitor circuitry 216 is supplied to the negative input of the error amplifier 148. The error amplifier 148 also preferably receives the MPS enable signal, which is generally similar to the MPS enable signal described above with reference to FIGS. 3 and 7. Therefore, when the MPS enable signal is asserted and the differential current reference voltage is greater than the second current monitor voltage or signal on line 222, the error amplifier 148 produces (or increases) the current control signal, which is generally similar to the current control signal described above with reference to FIGS. 3 and 7. On the other hand, when the MPS enable signal is asserted and the differential current reference voltage is less than or equal to the second current monitor voltage or signal on line 222, the error amplifier 148 does not produce (or decreases) the current control signal.

The current control signal is supplied to the controllable current source or load 142, as above, to cause the controllable current source or load 142 to increase and decrease the current drawn thereby. When the current control signal is turned on or increased, the controllable current source or load 142 is turned on (or the current drawn thereby is increased). On the other hand, when the current control signal is turned off or decreased, the controllable current source or load 142 is turned off (or the current drawn thereby is decreased). The change in the current drawn by the controllable current source or load 142 causes a proportionate change in the second current monitor voltage or signal on line 222 produced by the second current sense or monitor circuitry 216. The second current monitor voltage or signal on line 222 feeds back to the error amplifier 148 in order to regulate the current drawn by the controllable current source or load 142 at a level needed to maintain the overall current into the PD 128 (and the Networked Device 112) at least at the MPS minimum requirement during the low power mode.

The invention claimed is:

1. A method of causing power to be maintained to a powered device during a low power mode of the powered device, comprising:
   receiving electrical power by the powered device through a data transmission cable from a power sourcing device that monitors a load on the data transmission cable and turns off the power to the load if the load is outside of a range;
   reducing a first current drawn by the powered device at the powered device to put the powered device in the low power mode; and
   maintaining a level of a current into the powered device at least at a minimum level for at least a portion of a cycle time by changing a second current drawn by the powered device at the powered device in response to a monitored current value being different from a reference value, total current into the powered device being a sum of the first and second currents.

2. The method of claim 1 further comprising:
   varying the second current between zero and the minimum level depending on a level of the first current.

3. The method of claim 1 further comprising:
   monitoring total current into the powered device at the powered device to generate the monitored current value, which is representative of the level of the current into the powered device.

4. A method of causing power to be maintained to a powered device during a low power mode of the powered device, comprising:
   receiving electrical power by the powered device through a data transmission cable from a power sourcing device that monitors a load on the data transmission cable and turns off the power to the load if the load is outside of a range;
   reducing a first current to put the powered device in the low power mode; and
   maintaining a level of a current into the powered device at least at a minimum level for at least a portion of a cycle time by changing a second current in response to a monitored current value being different from a reference value, total current into the powered device being a sum of the first and second currents,
   wherein the monitored current value is a first monitored current value and the reference value is a differential reference value, further comprising:
   monitoring the first current to generate the first monitored current value, which is representative of a level of the first current;
   monitoring the second current to generate a second monitored current value, which is representative of a level of the second current;

generating the differential reference value by reducing an initial reference value by the first monitored current value; and maintaining the level of the current into the powered device at least at the minimum level by changing the second current in response to the second monitored current value being different from the differential reference value.

5. The method of claim 1 further comprising:
maintaining the level of the current into the powered device at least at the minimum level for at least 75 milliseconds at least every 250 milliseconds.

6. The method of claim 1 further comprising:
maintaining the level of the current into the powered device at least at the minimum level almost constantly.

7. The method of claim 1, wherein:
the data transmission cable is an Ethernet cable; and
the power sourcing device is a Power over Ethernet Power Sourcing Equipment device.

8. The method of claim 1 further comprising:
when the powered device is in the low power mode, the first current powering at least an indicator component from a first voltage, the indicator component indicating that the powered device is in the low power mode;
and wherein when the powered device is not in the low power mode, the indicator component is powered from a second voltage level that is lower than the first voltage level, the indicator component then indicates that the powered device is in a predetermined operational power mode.

9. A powered device that receives electrical power through a data transmission cable from a power supplying device, the power supplying device monitoring a load on the data transmission cable to turn off the power to the load if the load is outside of a range, comprising:
at least one first electronic component in the powered device that draws a first current from the power supplying device at least part of a time during which the powered device is in a low power mode;
a second electronic component in the powered device that draws a second current from the power supplying device during the low power mode; and
a current control circuit in the powered device connected to the second electronic component to control the second electronic component to increase and decrease the second current to maintain a sum of the first current and the second current at least at a minimum level for at least a portion of a cycle time.

10. The powered device of claim 9, wherein:
the current control circuit controls the second electronic component to increase and decrease the second current between zero and the minimum level depending on a level of the first current.

11. The powered device of claim 9, wherein:
the current control circuit controls the second electronic component to increase and decrease the second current in response to a monitored current value based on a current into the powered device being above or below a reference voltage.

12. The powered device of claim 9, wherein:
the current control circuit controls the second electronic component to increase and decrease the second current to maintain the sum of the first current and the second current at least at the minimum level for at least 75 milliseconds at least every 250 milliseconds.

13. The powered device of claim 9, wherein:
the current control circuit controls the second electronic component to increase and decrease the second current to maintain the sum of the first current and the second current at least at the minimum level almost constantly.

14. The powered device of claim 9, wherein:
the data transmission cable is an Ethernet cable; and
the power supplying device is a Power over Ethernet Power Sourcing Equipment device.

15. The powered device of claim 9, wherein:
the at least one first electronic component includes at least an indicator component;
when the powered device is in the low power mode, the first current powers the indicator component from a first voltage, and the indicator component indicates that the powered device is in the low power mode; and
when the powered device is not in the low power mode, the indicator component is powered from a second voltage level that is lower than the first voltage level, and the indicator component then indicates that the powered device is in a predetermined operational power mode.

16. A powered device that receives electrical power through a data transmission cable from a power supplying device that monitors a load on the data transmission cable and turns off the power to the load if the load is outside of a range, comprising:
at least one first electronic component that draws a first current at least part of a time during which the powered device is in a low power mode;
a second electronic component that draws a second current during the low power mode; and
a current control circuit connected to the second electronic component to control the second electronic component to increase and decrease the second current to maintain a sum of the first current and the second current at least at a minimum level for at least a portion of a cycle time,
wherein the current control circuit comprises:
generates a differential reference value by reducing an initial reference value by a first monitored current value, which is based on the first current; and
controls the second electronic component to increase and decrease the second current to maintain the sum of the first current and the second current at least at the minimum level for at least the portion of the cycle time in response to a second monitored current value, based on the second current, being different from the differential reference value.

17. A powered device that receives electrical power through a data transmission cable from a power sourcing device, comprising:
a means in the powered device for drawing a first current from the power sourcing device during a low power mode;
a means in the powered device for drawing a second current from the power sourcing device during the low power mode, a sum of the first current and the second current being a total current drawn by the powered device;
a means in the powered device for generating a monitored current value based on a level of the total current;
a means in the powered device for generating a differential reference value by reducing an initial reference value by the first monitored current value, which is based on the first current; and
a means in the powered device for turning off and on the means for drawing the second current in response to the monitored current value being above or below a reference value to maintain the level of the total current at least at a minimum value for at least a portion of a cycle time while the powered device is in the low power mode.

18. The powered device of claim 17, wherein:
the level of the total current is maintained at least at the minimum level for at least 75 milliseconds at least every 250 milliseconds.

19. The powered device of claim 17, wherein:
the level of the total current is maintained at least at the minimum level almost constantly.

20. The powered device of claim 17, wherein:
the means for drawing the first current includes at least a means for indicating a mode of the powered device;
when the powered device is in the low power mode, the means for indicating the mode of the powered device is powered from a first voltage, and the means for indicating the mode of the powered device indicates that the powered device is in the low power mode; and
when the powered device is not in the low power mode, the means for indicating the mode of the powered device is powered from a second voltage level that is lower than the first voltage level, and the means for indicating the mode of the powered device then indicates that the powered device is in a predetermined operational power mode.

21. A powered device that receives electrical power through a data transmission cable from a power sourcing device, comprising:
a means in the powered device for drawing a first current during a low power mode;
a means in the powered device for drawing a second current during the low power mode, a sum of the first current and the second current being a total current drawn by the powered device;
a means in the powered device for generating a monitored current value based on a level of the total current; and
a means in the powered device for turning off and on the means for drawing the second current in response to the monitored current value being above or below a reference value to maintain the level of the total current at least at a minimum value for at least a portion of a cycle time while the powered device is in the low power mode.

* * * * *